US006325715B1

(12) United States Patent
Nagata

(10) Patent No.: US 6,325,715 B1
(45) Date of Patent: Dec. 4, 2001

(54) METHOD FOR EXECUTING KNOCK-AWAY STACKED-BLOCK GAME, GAME MACHINE USING THE METHOD, AND RECORDING MEDIUM PROVIDED WITH THE SAME

(75) Inventor: Akihiko Nagata, Tokyo (JP)

(73) Assignee: Konami Co., Ltd. (JP)

( * ) Notice: Subject to any disclaimer, the term of this patent is extended or adjusted under 35 U.S.C. 154(b) by 0 days.

(21) Appl. No.: 09/590,662

(22) Filed: Jun. 8, 2000

(30) Foreign Application Priority Data

Jun. 12, 1999 (JP) .................................................. 11-202124

(51) Int. Cl.[7] ....................................................... A63F 13/00
(52) U.S. Cl. .................................................... 463/5; 463/36
(58) Field of Search ............................... 463/1–5, 30–32, 463/43

(56) References Cited

U.S. PATENT DOCUMENTS 4,415,153 * 11/1983 Yokoi ...................................... 463/23
5,265,888 * 11/1993 Yamamoto et al. ................... 463/10

* cited by examiner

Primary Examiner—Jessica J. Harrison
Assistant Examiner—John M Hotaling, II
(74) Attorney, Agent, or Firm—Bachman & LaPointe, P.C.

(57) ABSTRACT

A portable game machine has a game-processing unit accommodated in a housing. The game-processing unit displays, on a display, at least the image of a sub-block to be struck among a plurality of stacked sub-blocks and a main-block thereon. The game-processing unit also uses, among first strike data and second strike data sequentially input from an input unit by a game player, the first strike data as information for determining a virtual displacement of a sub-block positioned at a predetermined stage among the plurality of sub-blocks, and the second strike data as a displacement of the sub-block within the virtual displacement, and determines the displacement of the sub-block based on the second strike in the game-processing unit. The game-processing unit displays, on the display, a resultant image corresponding to the state of each of the blocks which changes based on the determination result.

72 Claims, 11 Drawing Sheets

| | LIGHT | LOW-SPEED CHANGE IN Y METER | HIGH-SPEED CHANGE IN X METER |
|---|---|---|---|
| | NORMAL | INTERMEDIATE-SPEED CHANGE IN Y METER | INTERMEDIATE-SPEED CHANGE IN X METER |
| | HEAVY | HIGH-SPEED CHANGE IN Y METER | LOW-SPEED CHANGE IN X METER |

FIG. 8

|        | LV1  | LV2  | LV3  |
|--------|------|------|------|
| HEAVY  | 0.05 | 0.03 | 0.02 |
| NORMAL | 0.1  | 0.08 | 0.06 |
| LIGHT  | 0.12 | 0.1  | 0.08 |

FIG. 10

| GRADUATION | LV1 | LV2 | LV3 |
|---|---|---|---|
| 0 | 0.25 | 0.2 | 0.15 |
| 1 | 0.45 | 0.4 | 0.3 |
| 2 | 0.45 | 0.4 | 0.3 |
| 3 | 0.4 | 0.35 | 0.25 |
| 4 | 0.4 | 0.35 | 0.25 |
| 5 | 0.35 | 0.3 | 0.2 |
| 6 | 0.35 | 0.3 | 0.2 |
| 7 | 0.3 | 0.25 | 0.15 |
| 8 | 0.3 | 0.25 | 0.15 |
| 9 | 0.25 | 0.2 | 0.1 |
| 10 | 0.25 | 0.2 | 0.1 |
| 11 | 0.25 | 0.2 | 0.1 |

FIG. 11

| GRADUATION | LV1 | LV2 | LV3 |
|---|---|---|---|
| 0 | 0.15 | 0.1 | 0.05 |
| 1 | 0.35 | 0.3 | 0.2 |
| 2 | 0.35 | 0.3 | 0.2 |
| 3 | 0.3 | 0.25 | 0.2 |
| 4 | 0.3 | 0.25 | 0.15 |
| 5 | 0.25 | 0.2 | 0.15 |
| 6 | 0.25 | 0.2 | 0.1 |
| 7 | 0.2 | 0.15 | 0.1 |
| 8 | 0.2 | 0.15 | 0.1 |
| 9 | 0.15 | 0.1 | 0.05 |
| 10 | 0.15 | 0.1 | 0.05 |
| 11 | 0.15 | 0.1 | 0.05 |

FIG. 12

| GRADUATION | LV1 | LV2 | LV3 |
|---|---|---|---|
| 0 | 0.1 | 0.08 | 0.05 |
| 1 | 0.25 | 0.2 | 0.1 |
| 2 | 0.25 | 0.2 | 0.1 |
| 3 | 0.25 | 0.2 | 0.1 |
| 4 | 0.2 | 0.15 | 0.1 |
| 5 | 0.2 | 0.15 | 0.1 |
| 6 | 0.2 | 0.15 | 0.1 |
| 7 | 0.15 | 0.1 | 0.1 |
| 8 | 0.15 | 0.1 | 0.05 |
| 9 | 0.15 | 0.1 | 0.05 |
| 10 | 0.1 | 0.08 | 0.05 |
| 11 | 0.1 | 0.08 | 0.05 |

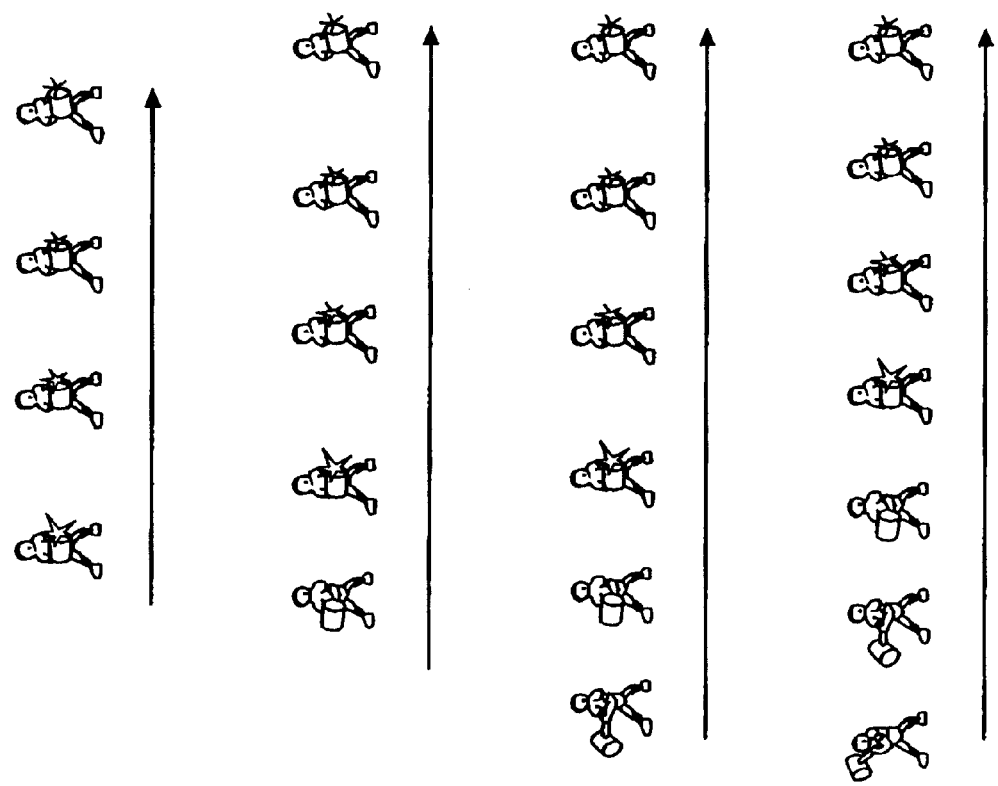
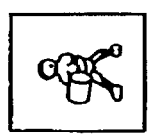
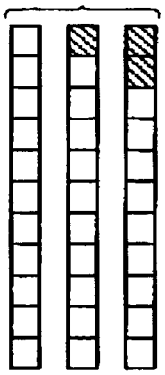
FIG. 13A
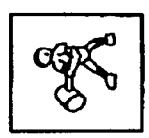
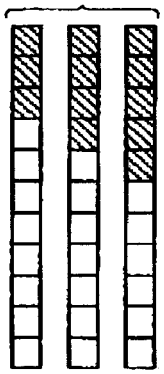
FIG. 13B
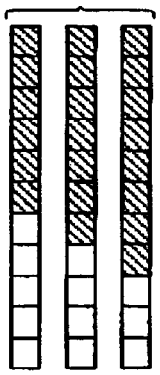
FIG. 13C
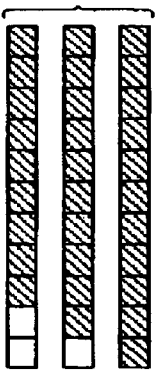
FIG. 13D

METHOD FOR EXECUTING KNOCK-AWAY STACKED-BLOCK GAME, GAME MACHINE USING THE METHOD, AND RECORDING MEDIUM PROVIDED WITH THE SAME

BACKGROUND OF THE INVENTION

1. Field of the Invention

The present invention relates to computer game technology, and in particular, to a technique for realizing a knock-away stacked-block game in which a plurality of stacked sub-blocks and a main-block on the sub-blocks are displayed on a display and the sub-blocks are sequentially knocked away from the lower stage.

2. Description of the Related Art

The knock-away stacked-block game is popular since a game player is thrilled by knocking away a block while controlling the knocking force so that stacked objects or blocks remain balanced, and the game player can feel a sense of release from mental tension when the balance is lost. Moreover, or the game is very simple. Accordingly, this type of game can strongly absorb the game player even although it is a classic game. In the knock-away stacked-block game, a main-block is put on stacked sub-blocks, and each of the sub-blocks are physically knocked away with a hammer or the like in sequential order.

Due to the recent progress of technology, various types of game machines using electronic circuits have been proposed. Each of the game machines normally includes an input unit operated by a game player, a game processor for executing game processing based on operations input by the input unit, and a display for displaying the result of the executed processing.

In the field of the game machines, there are portable game machines each including an input unit, a game processor, and a display, which are accommodated in a housing which is small enough to be carried.

The development of attractive game machines of the portable type increasingly required, similarly to other types of game machines. However, since the portable game machines have stricter limitations on hardware, including a storage unit, than the other types of game machines, highly entertaining, attractive game machines are difficult to develop.

Accordingly, the knock-away stacked-block game, which is guaranteed to be highly entertaining, has much appeal as a game adapted for the portable game machine. Nevertheless, no specific method for executing the knock-away stackedblock game in a game machine is currently known.

SUMMARY OF THE INVENTION

Accordingly, it is an object of the present invention to provide a method for executing a knock-away stacked-block game in a game machine.

It is another object of the present invention to provide a computer-readable recording medium for executing the knock-away stacked-block game by controlling a computer in the game machine.

According to an aspect of the present invention, the foregoing objects are achieved through provision of a method for executing a knock-away stacked-block game, which is provided for a game machine including an input unit operated by a game player, a game-processing unit for executing game processing based on an operation input from the input unit, and a display for displaying the result of the processing executed by the game-processing unit. The method includes the steps of: displaying at least the image of a sub-block to be struck, among a plurality of stacked sub-blocks and a main-block provided thereon, on the display; using, among first strike data and second strike data sequentially input from the input unit by a game player, the first strike data as information for determining a virtual displacement of a sub-block positioned at a predetermined stage among the plurality of sub-blocks, and the second strike data as a displacement of the sub-block within the virtual displacement, and determining the displacement of the sub-block based on the second strike in the game-processing unit; and displaying, on the display, a resultant image corresponding to the state of each of the blocks which changes based on the determination result.

Preferably, the method further includes a step in which: when an accumulated value of displacements of the sub-block, caused by at least one strike, is greater than a predetermined first value corresponding to the width of each of the sub-blocks, or is within a predetermined second value corresponding to a range in which the sub-blocks and the main-block can balance on the second stage, the game-processing unit determines that the at least one strike has been successful; and when the accumulated value is not greater than the first value and not less than the second value, the game-processing unit determines that the at least one strike has failed, and displays a picture corresponding to the failure when the game-processing unit has determined that the at least one strike has failed.

The method may further include a step in which a plurality of gauges, composed of a plurality of small areas sequentially arranged in predetermined directions, are displayed on the display, and the gauges display timing information used as a guide for the game player to input the first strike data and the second strike data.

The gauges may use a move generated by sequentially displaying the small areas in the gauges, whereby the timing information is provided to the game player.

The gauges may consist of a gauge for inputting the first strike data and a gauge for inputting the second strike data.

In the method, an indicator may be displayed on a position in which the sub-block is struck and the indicator is changed in accordance with the display mode of the timing information.

The gauge for inputting the first strike data and the gauge for inputting the second strike data may use different display modes to display the timing information, and the indicator may be displayed so as to change depending on the different display modes.

In the method, a change of the indicator in accordance with a move indicating the timing information, which corresponds to the input of the first strike data, may be displayed as a change in the position of the indicator with respect to the position in which the sub-block is struck.

The method may further include a step in which a plurality of choices on display-mode information for determining the move of the timing information are displayed for the game player, and the timing information is displayed by the gauges based on display-mode information selected with the input unit by the game player before the game player inputs the first strike data.

The method may further include a step in which, when all the sub-blocks have got knocked away, the game-processing unit determines that the game player obtains a success in the game, and when the game-processing unit has determined that the game player has obtained a success in the game, a picture corresponding to the success is displayed on the display.

According to another aspect of the present invention, the foregoing objects are achieved through provision of a game machine including an input unit operated by a game player, a game-processing unit for executing game processing based on an operation input from the input unit, and a display for displaying the result of the processing executed by the game-processing unit. The game-processing unit displays at least the image of a sub-block to be struck on the display among a plurality of stacked sub-blocks and a main-block provided thereon. The game-processing unit uses, among first strike data and second strike data sequentially input from the input unit by a game player, the first strike data as information for determining a virtual displacement of a sub-block positioned at a predetermined stage among the plurality of sub-blocks, and the second strike data as a displacement of the sub-block within the virtual displacement, and determines the displacement of the sub-block based on the second strike in the game-processing unit. The game-processing unit displays, on the display, a resultant image corresponding to the state of each of the blocks which changes based on the determination result.

Preferably, the input unit, the game-processing unit, and the display are accommodated in a housing which is small enough to be carried.

According to a further aspect of the present invention, the foregoing objects are achieved through provision of a recording medium containing a program code for controlling a computer to operate as a game machine. The computer including a predetermined display and an input unit operated by a game player. The program code controls the computer to execute the steps of: displaying at least the image of a sub-block to be struck, among a plurality of stacked sub-blocks and a main-block provided thereon, on the display; using, among first strike data and second strike data sequentially input from the input unit by a game player, the first strike data as information for determining a virtual displacement of a sub-block positioned at a predetermined stage among the plurality of sub-blocks, and the second strike data as a displacement of the sub-block within the virtual displacement, and determining the displacement of the sub-block based on the second strike in the game-processing unit; and displaying, on the display, a resultant image corresponding to the state of each of the blocks which changes based on the determination result.

In this specification, the program code is a concept that includes data required for control the computer to executing the knock-away stacked-block game, and control parameters, in addition to the program itself.

According to a method for executing a knock-away stacked-block game of the present invention, the knock-away stacked-block game can be executed without performing complicated processing. The method enables a game player to virtually enjoy an actual knock-away stacked-block game.

According to a method for executing a knock-away stacked-block game of the present invention, a technique using an indicator enables a game player to intuitively understand the correspondence between timing information and that in an actual knock-away stacked-block game.

According to a game machine of the present invention, a combination of its portability and a knock-away stacked-block game provides a highly entertaining game machine.

According to the present invention, by using a game machine, a highly entertaining knock-away stacked-block game can be executed. This feature is very effective for differentiating the game machine from other types of game machines. The execution of the knock-away stacked-block game is realized by simple processing. Thus, the present invention is valuable in that the knock-away stacked-block game can be executed even in a portable game machine having strict limitations on a storage unit. In addition, by reading a program code from a computer-readable storage medium containing the program code, a method for executing a knock-away stacked-block game can be performed in a multipurpose computer or a domestic game machine.

BRIEF DESCRIPTION OF THE DRAWINGS

FIG. 8 is a table showing the length of each frame of sequential images of timing information displayed on a gauge for inputting first strike data;

FIG. 10 is a table showing the length of each frame of sequential images of timing information displayed on a gauge for inputting second strike data when a hammer H is selected;

FIG. 11 is a table showing the length of each frame of sequential images of timing information displayed on a gauge for inputting second strike data when a hammer N is selected;

FIG. 12 is a table showing the length of each frame of sequential images of timing information displayed on a gauge for inputting second strike data when a hammer L is selected; and FIGS. 13A, 13B, 13C, and 13D are illustrations of relationships between timing information displayed on a gauge for inputting second strike data and a simultaneously displayed animation.

DESCRIPTION OF THE PREFERRED EMBODIMENTS

With reference to the accompanying drawings, embodiments of the present invention are described below.

First, a method for executing a knock-away stacked-block game in a portable game machine is described with reference to FIGS. 1 and 2.

Figure 1:
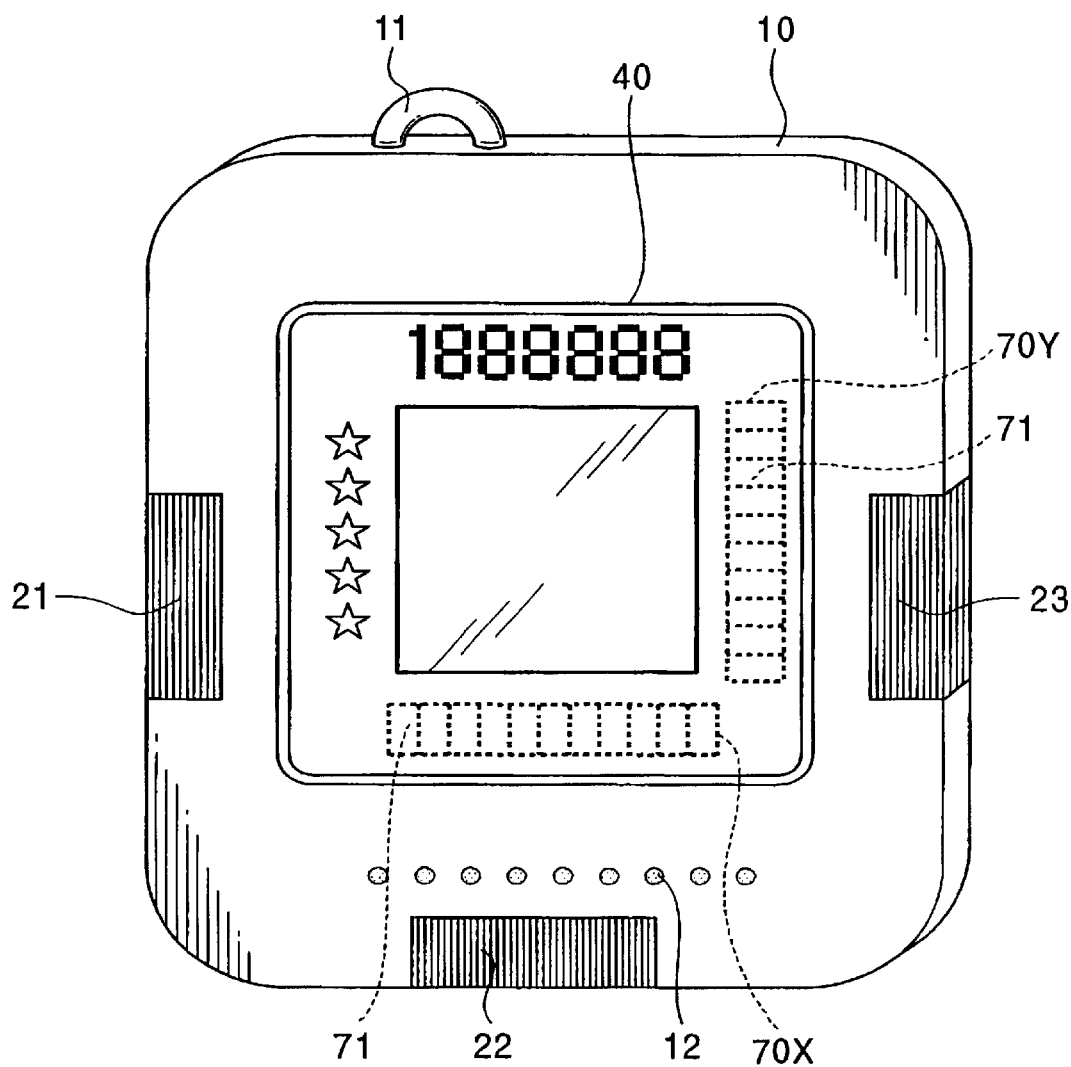
FIG. 1 is a perspective view showing the exterior of a portable game machine according to an embodiment of the present invention.
Figure 2:
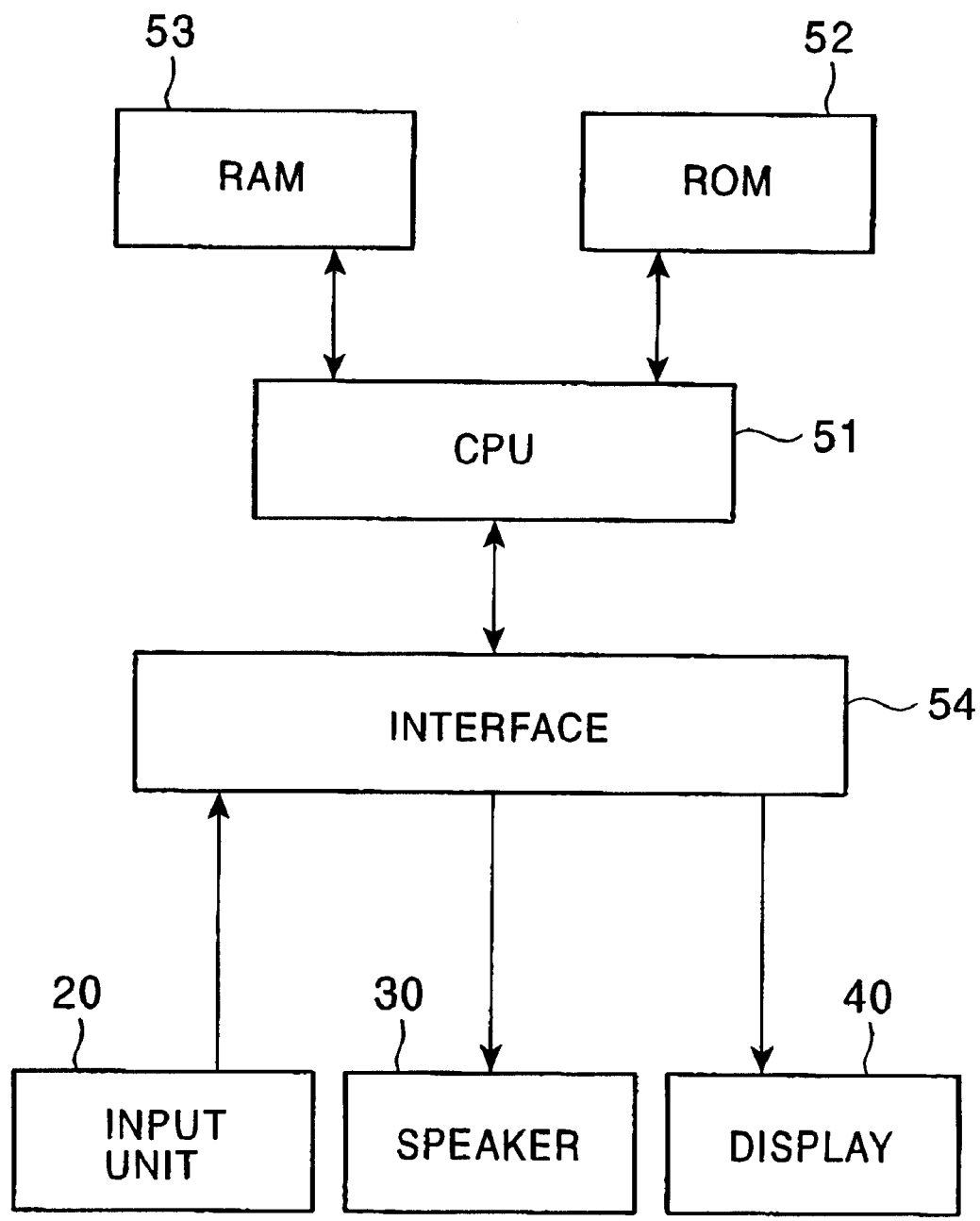
FIG. 2 is a block diagram showing the internal structure of the portable game machine shown in FIG. 1.

The portable game machine shown in FIG. 1 includes an input unit 20, a speaker 30, and display 40, which are accommodated in a housing 10, as shown in FIG. 2. The housing 10 is small enough to be held by a hand. At the top of the housing 10, a semicircular hook 11 is provided which is connected to a chain or the like of a key holder, as shown in FIG. 2.

The input unit 20 includes three operation keys 21, 22, and 23 provided on two sides and the bottom of the housing 10. The display 40 is, for example, a dot-matrix liquid-crystal display and has a substantially rectangular display screen for a game player. Below the display 40 shown in FIG. 1, a plurality of speaker holes 12 for outputting sounds from the speaker 30 are formed.

The portable game machine shown in FIG. 1 includes a central processing unit (CPU) 51, a read-only memory (ROM) 52, a random access memory (RAM) 53, and an interface 54, as shown in FIG. 2. The ROM 52, the RAM 53, and the interface 54 are connected to the CPU 51. The CPU 51 controls the entirety of the portable game machine. The ROM 52 stores a program for operating the CPU 51, and rules and image data for the knock-away stacked-block game. The RAM 53 provides a work area required for the CPU 51 to perform data processing.

The interface 54 functions as an input/output connection circuit. The input unit 20, the speaker 30, and the display 40 are connected to the CPU 51 via the interface 54. Operation information generated by operating the input unit 20 is input to the CPU 51 via the interface 54. Image information to be displayed on the display 40, and audio information to be output from the speaker 30, which are generated by the CPU 51, are output from the display 40 and the speaker 30 via the interface 54, respectively.

Figure 3:
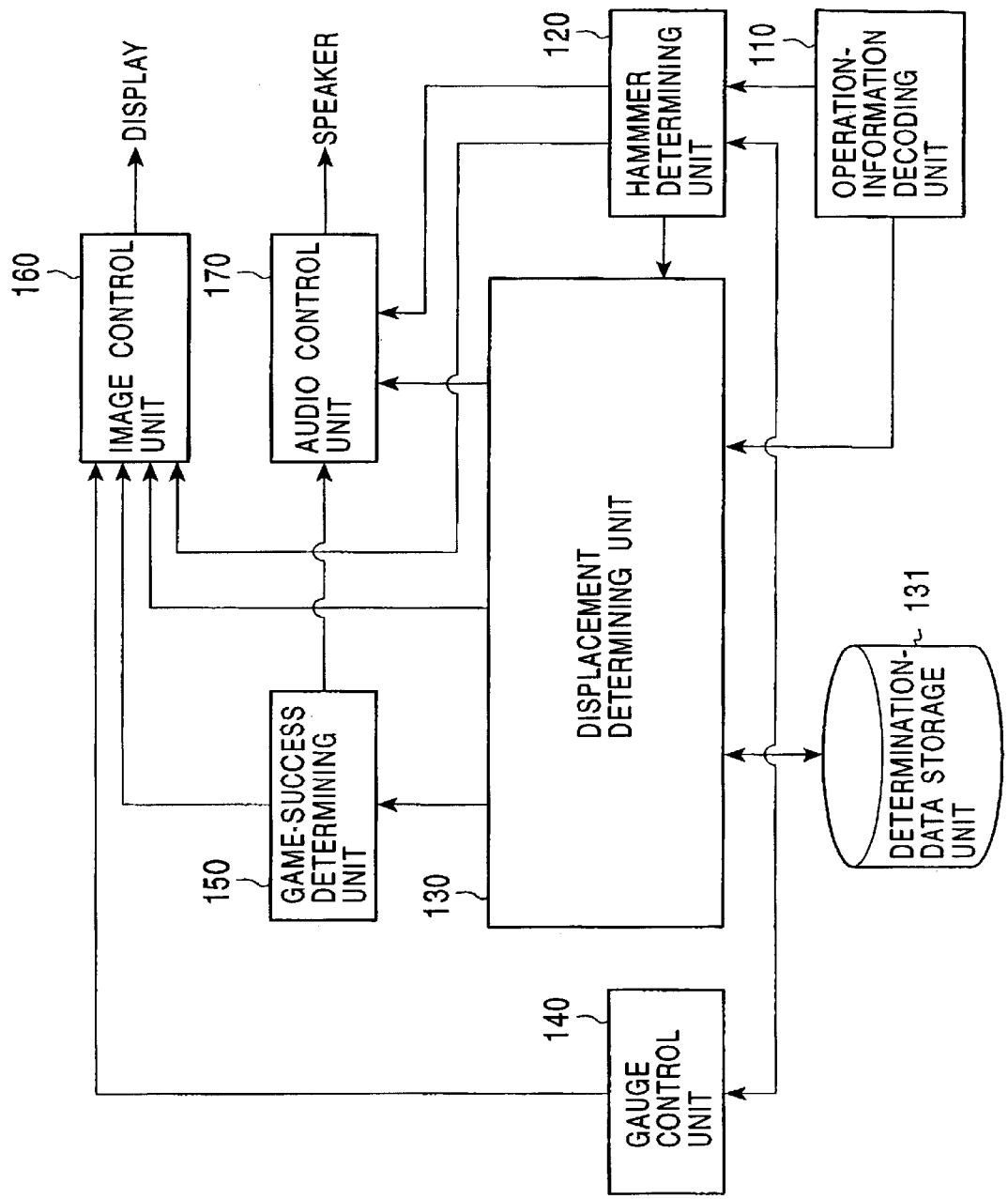
FIG. 3 is a block diagram showing functional subblocks generated in the portable game machine shown in FIG. 1.

In the portable game machine, by switching on the main power, the functional sub-blocks shown in FIG. 3 are generated. Specifically, an operation-information decoding unit 110, a hammer determining unit 120, a displacement determining unit 130, a gauge control unit 140, a game-success determining unit 150, an image control unit 160, and an audio control unit 170 are generated. These units constitute a game processor in the present invention.

The operation-information decoding unit 110 is connected to the input unit 20 via the interface 54, and also to the hammer determining unit 120 and the displacement determining unit 130. The operation-information decoding unit 110 decodes operation information input from the input unit 20, and supplies the decoded information to the hammer determining unit 120 and the displacement determining unit 130.

The hammer determining unit 120 determines the type of hammer to be used by the game player based on the information from the operation-information decoding unit 110, and supplies the determination information to the displacement determining unit 130, the gauge control unit 140, the image control unit 160, and the audio control unit 170. Types of hammers are described below.

The displacement determining unit 130 determines, based on first strike data and second strike data from the operation-information decoding unit 110 and on strength information from the hammer determining unit 120, a displacement of sub-blocks, which is caused by the strikes, and the states of the sub-blocks and a main-block, which are obtained after the displacement. The displacement determining unit 130 is connected to a determination-data storage unit 131, and uses parameters stored in the determination-data storage unit 131 when performing the determination. The displacement determining unit 130 supplies the determination result to the game-success determining unit 150, the image control unit 160, and the audio control unit 170.

The game-success determining unit 150 determines whether the game player has succeeded or failed in the knock-away stacked-block game. Specifically, when the game player has knocked away all the sub-blocks excluding the main-block, the game-success determining unit 150 determines that the game player has succeeded in the game. When the game player has broken the sub-blocks or the main-block, the game-success determining unit 150 determines that the game player has failed in the game. The determination result is supplied to the image control unit 160 and the audio control unit 170.

The gauge control unit 140 is connected to the hammer determining unit 120, and controls, based on information input from the hammer determining unit 120 and predetermined data, the displayed gauge 70 for providing the game player with information as a guide for the game player to operate the input unit 20. The gauge control unit 140 is connected to the image control unit 160, and information required for displaying the gauge 70 is supplied to the image control unit 160.

Each of the image control unit 160 and the audio control unit 170 is connected to the hammer determining unit 120, the displacement determining unit 130, the gauge control unit 140, and the game-success determining unit 150, and receives data on the progress of the game from each of the units. The image control unit 160 displays a picture based on the input information, and the audio control unit 170 outputs sounds adapted for the picture.

In the above-described portable game machine, the knock-away stacked-block game in the present invention is executed in accordance with the following process.

Figure 4:
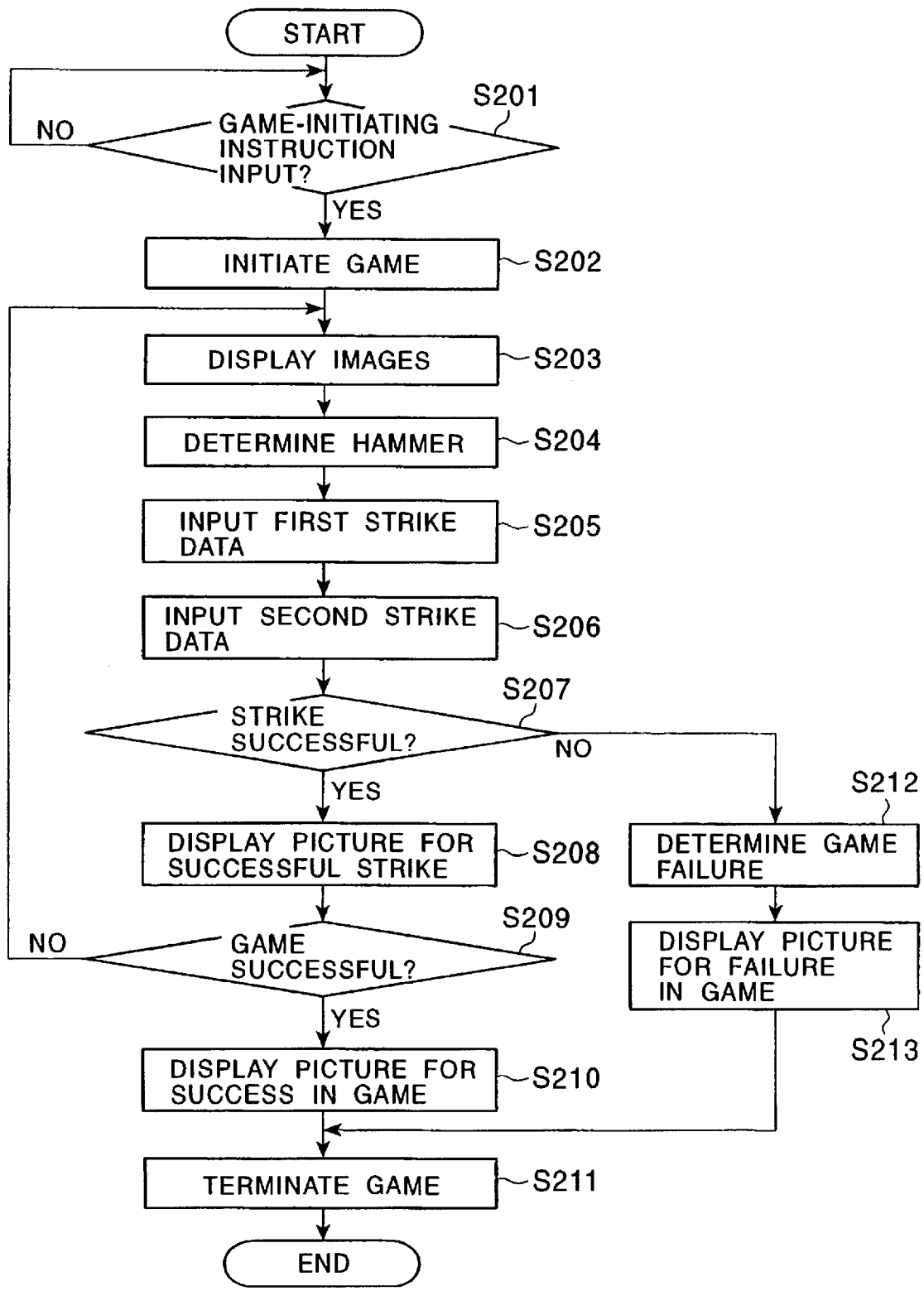
FIG. 4 is a flowchart showing the progress of a game executed by the portable game machine shown in FIG. 1.

First, the overall process is described with reference to FIG. 4.

At the beginning of the game, a game title and opening images are displayed on the display 40. When the process has determined that a game-initiating instruction is input from the input unit 20 (step S201), the game is initiated (step S202). Specifically, when any one of the operation keys 21, 22, and 23 is used for inputting, the process has determined that the initiation of the game is instructed. If no instruction is input, the game title and opening images are repeatedly displayed.

Figures 5, 6:
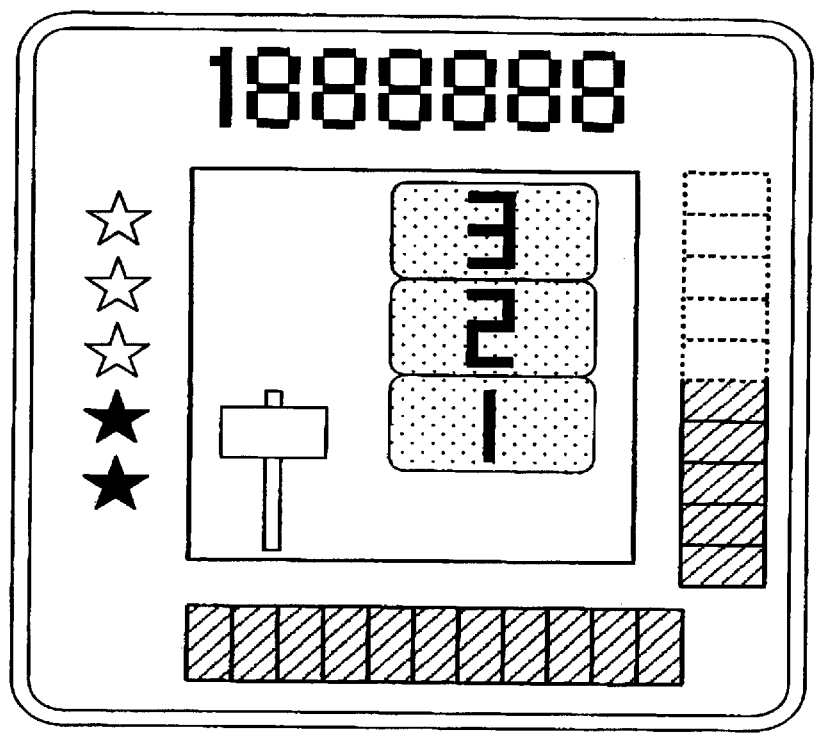
FIG. 5 is a front view showing the screen of a display of the portable game machine shown in FIG. 1, which appears when a game is executed.
FIG. 6 is a table showing display-condition information corresponding to types of hammers.

After the game is initiated, in addition to a score and an indicator of the game level, among the sub-blocks and the main-block, at least an image including a sub-block to be struck and the gauge 70 are displayed (step S203). A gauge 70X (shown in FIG. 1) is formed by sequentially arranging eleven small areas 71 in a line, and a gauge 70Y (shown in FIG. 1) is formed by sequentially arranging ten small areas 71 in a line. The gauge 70X is displayed along the bottom side of the display 40, and the gauge 70Y is displayed along the right side of the display 40, as shown in FIG. 5. The displayed small areas 71 correspond to dots constituting the liquid crystal display 40.

Next, the type of hammer is determined (step S204). Each type of hammer corresponds to each choice of strength information in the present invention. In this embodiment, three types, "LIGHT" (hereinafter indicated by "L"), "NORMAL" (hereinafter indicated by "N"), and "HEAVY" (hereinafter indicated by "H") are prepared. The characteristics of the hammers are as shown in FIG. 6.

The game player uses the operation keys 21, 22, and 23 to selectively determine one of the prepared hammers. This determination enables the game player to select preferable information on timing-information display modes using the gauge 70X (X meter) and the gauge 70Y (Y meter). The hammer is selected by using the operation keys 21 and 23 provided on the two sides of the game machine. Specifically, when the operation key 21 is operated, the images of different hammers are displayed on the display 40 in the order of the hammer N, the hammer H, the hammer L, and the hammer N. When the operation key 23 is operated, images of different hammers are displayed on the display 40 in the inverse order. By operating the operation key 22, the hammer displayed that time is selected. When no hammer is selected in a predetermined time limit, the hammer displayed at the time the time limit expires is automatically selected.

Figure 7:
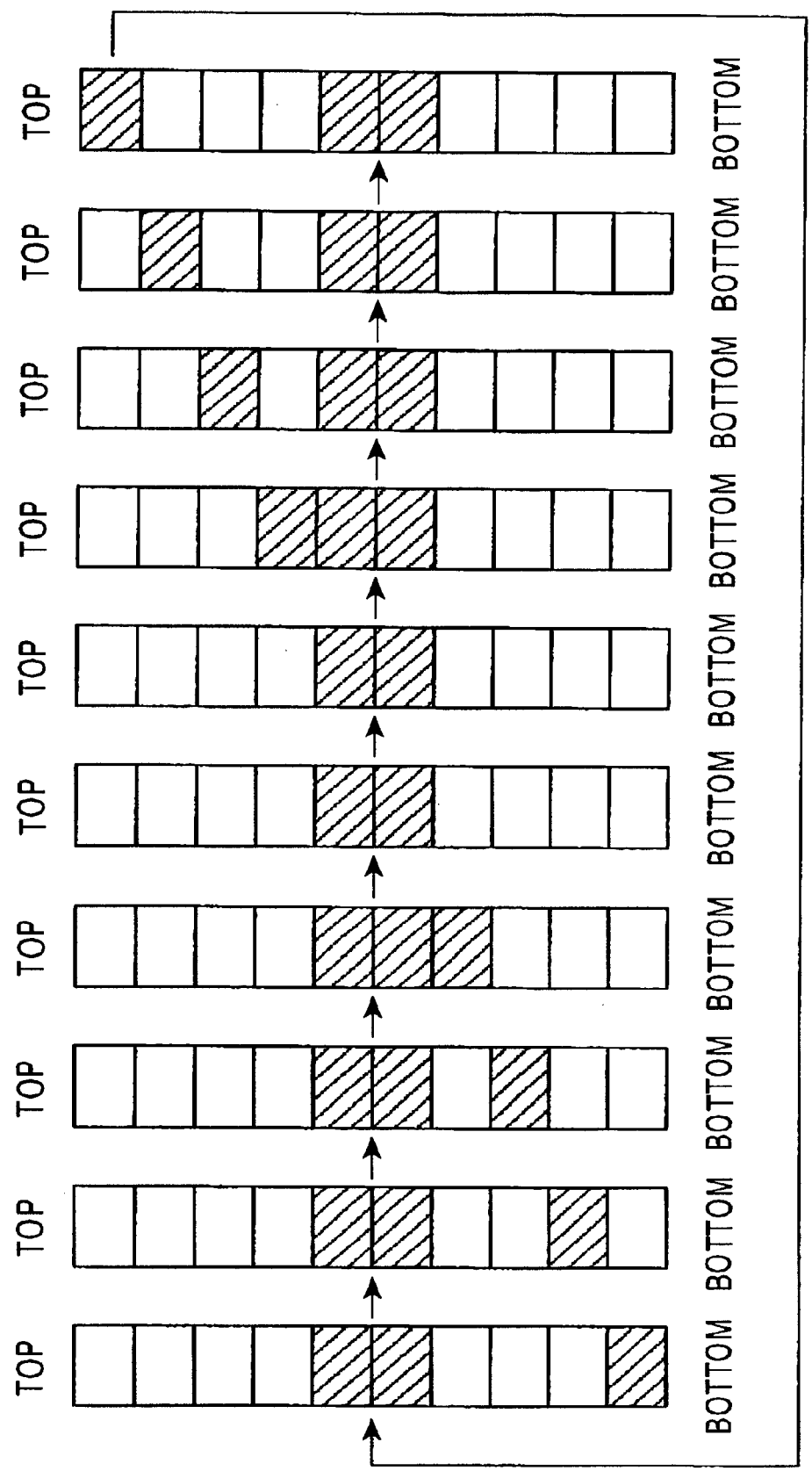
FIG. 7 is an illustration of examples of timing information displayed on a gauge for inputting first strike data.

By selecting the hammer, the sequential images shown in FIG. 7 are displayed on the gauge 70Y. The game player operates any one of the operation keys 21, 22, and 23 while viewing the timing information displayed by the gauge 70Y, whereby first strike data is input (step S205). The sequential images displayed by the gauge 70Y are specifically such that, among the ten small areas 71, two small areas in the center are displayed to be always black, and one designated small area in black is displayed to be reciprocally positioned in the upper and lower parts. The two small areas in the center displayed to be always black are used as a guide for the game player to input the first strike data. Specifically, when the designated small area is positioned to be superimposed on the two small areas, and the player inputs the first strike data, the first strike data is set to a value of 11. When the designated small area is positioned adjacently to the two small areas, and the player inputs the first strike data, the first strike data is set to a value of 8. when the designated small area is positioned to have other positional relationships with respect to the two small areas, and the player inputs the first strike data, the first strike data is set to a value of 6.

The first strike data relates to a virtual displacement that is a maximum value of second strike data determining a displacement of a sub-block. By increasing the virtual displacement, the second strike data can be greatly selected. Accordingly, by operating the operation key 21, 22, or 23 at the time the designated small area is superimposed on the two small areas, the game player can advantageously advance the development of the game. When the gauge Y is used to display sequential images, the image of the hammer, which moves upward and downward. is displayed synchronizing with the vertical move of the hammer. By setting the center of the vertical move of the hammer on the center of a sub-block to be struck, the correspondence between the vertical move of the designated area and the position of the sub-block at which the hammer is struck is established. The above-described rendering enables the game player to intuitively understand an advantage due to a displacement of the sub-block increased by inputting the first strike data with timing that the game player can strike the center of the sub-block with the hammer, that is, timing that the designated small area is superimposed on the two small areas.

When the game player inputs nothing for the first strike data in the predetermined time limit, the first strike data is determined based on the position of the designated area at the time the time limit expires.

An animation on the gauge 70Y is displayed at the speeds shown in FIG. 8. Referring to the case of level 1 (hereinafter indicated by "LV1") as an example, when the hammer H is selected, the animation is displayed so that the display time of one frame is 0.05 seconds. When the hammer N is selected, the animation is displayed so that the display time of one frame is 0.1 seconds. When the hammer L is selected, the animation is displayed so that the display time of one frame is 0.12 seconds. When the game player operates the operation key 21, 22, or 23 at the time the designated small area is at the target position, the selection of the hammer L accordingly sets the easiest game level. As described above, in the method for executing the knock-away stacked-block game, to select which of the hammers H, N, and L influences the display mode of the gauges 71.

Figure 9:
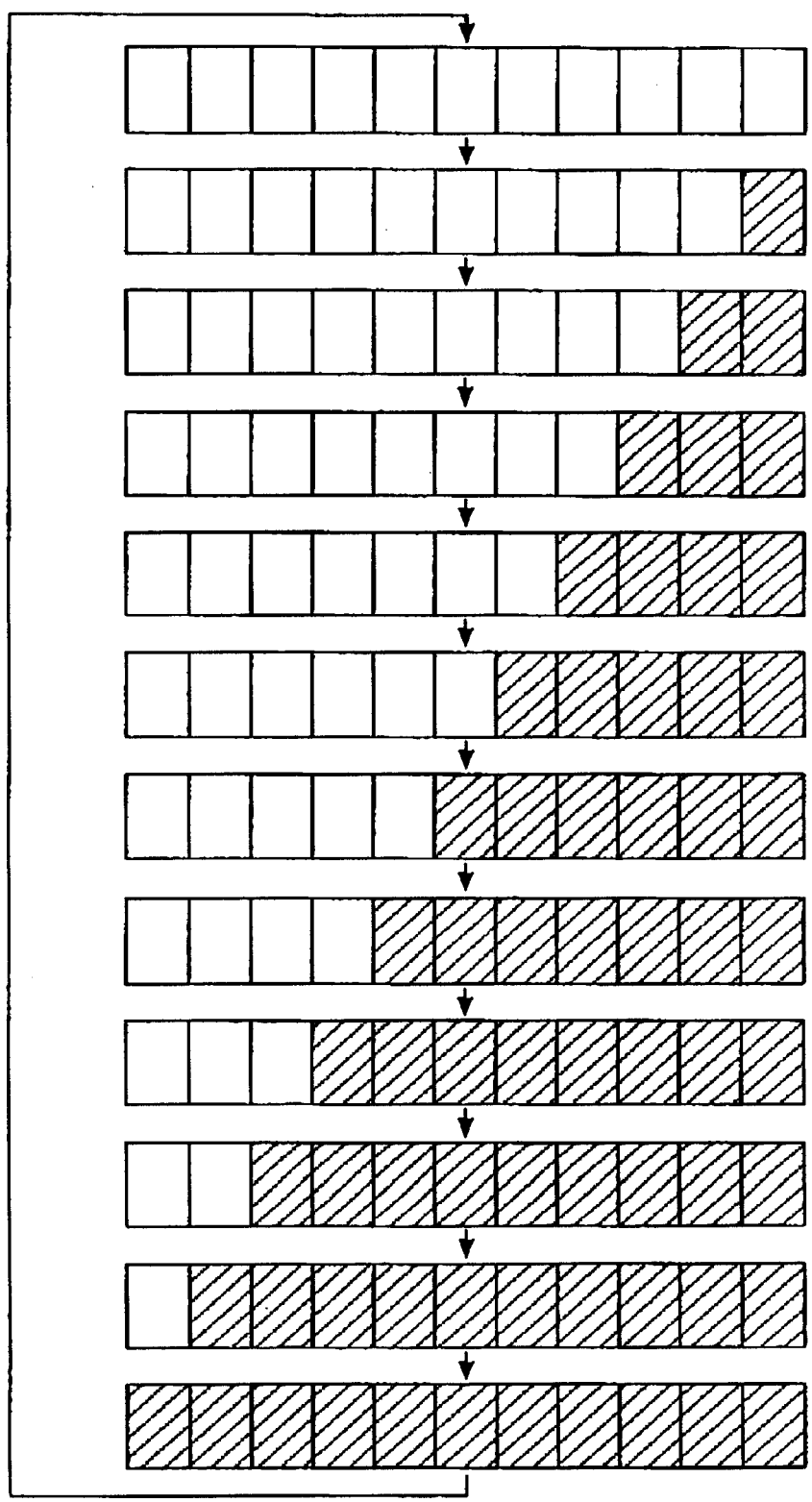
FIG. 9 is an illustration of examples of timing information displayed on a gauge for inputting second strike data.

When the input of the first strike data ends, the sequential images shown in FIG. 9 are displayed by the gauge 70X. The game player operates the operation key 21, 22, or 23 while viewing the timing information displayed by the gauge 70X, whereby the second strike data is input (step S206). The sequential images are displayed by the gauge 70X by initially displaying all the small areas 71 in white, inverting the colors of the small areas 71 from the most right small area, and repeatedly performing these steps when all the small areas 71 are finally displayed in black. This display corresponds to the case when the first strike data has a value of 11. In the case where the first strike data has a value of 8, all the small areas 71 are displayed in white at the time the colors of the most right small area to the eighth small area are inverted to be black. In the case where the first strike data has a value of 6, all the small areas 71 are displayed in while at the time the colors of the most right small area to the sixth small area are inverted to be black. When the game player operates the operation key 21, 22, or 33 while the gauge 70X is being displayed corresponding to the value of the first strike data, the second strike data is determined. The value of the second strike data coincides with the number of the black small areas at the time the operation key 21, 22, or 23 is operated. When the sequential images are displayed by the gauge 70Y, the display 40 displays an animation indicating that a game character holds the hammer over his or her head and swings the hammer for practice, using the correspondence shown in FIG. 12. This means that, as the game character holds the hammer deeply over his or her head (when the black small areas are larger), the second strike data directly connected to the displacement of the sub-block increases. Therefore, this rendering makes sense in that the picture displayed on the display 40 enables the game player to intuitively understand the obtainment of an advantage by input the second strike data when the black areas are larger. When the game player inputs nothing for the second strike data within the predetermined time limit, the second strike data is determined based on the position of the designated small area at the time the time limit expires.

At this time, a time per frame for displaying the animation of each image is controlled as shown in FIGS. 10 to 12. FIG. 10 is a table for the case where the hammer H is selected, FIG. 11 is a table for the case where the hammer N is selected, and FIG. 12 a table for the case where the hammer L is selected. As can be understood from the comparison of the tables, in the case where the hammer H is selected, each time per frame is set to be longest. Accordingly, in order that the game player may input the second strike data with the desired timing, the selection of the hammer H is most advantageous. In other words, considering also the cases of the first strike data, the game level is as follows: when the hammer H is selected, the degree of difficulty in inputting the first strike data is set to be high, and the degree of difficulty in inputting the second strike data is set to be low; when the hammer L is selected, the degree of difficulty in inputting the second strike data is set to be high, and the degree of difficulty in inputting the first strike data is set to be low; and when the hammer N is selected, both degrees are set be intermediate. Since the game player can select preferable mode information from information on the display modes of the timing information in accordance with his or her specialty or mood, the game player is free from getting tired of the game.

When the Input of the second strike data ends, the displacement determining unit 130 determines whether the game character has successfully struck or has failed to strike (step S207). In this embodiment, a first value is set at 16, and a second value is set at 7. Accordingly, when an accumulated value of displacements of a sub-block at the time the strike ends, that is, the sum of second strike data on the sub-block is not less than 16, the displacement determining unit 130 determines that the game character has knocked away the sub-block. When the accumulated value of the displacements is not greater than 7, the displacement determining unit 130 determines that the game character has failed to knock away the sub-block, but a main-block and other sub-blocks can balance on the sub-block. When the value of the second strike data is 11, the displacement determining unit 130 determines regardless of the accumulated value of the displacements that the struck sub-block has got knocked away. When the accumulated value of the displacements is 8 to 15, the displacement determining unit 130 determines that the stacked main-block and sub-blocks cannot balance on the sub-block. In short, in the above-described first and second cases, the displacement determining unit 130 determines success in striking, and in the third case, the displacement determining unit 130 determines a failure in striking. Among the first and second cases, the score of the game can be set so as to differ between the case where success in striking is obtained by a plurality of strikes and the case where success in striking is obtained by a single strike. By setting the game, as described above, the game player can be prompted to aim at knock-away by a single strike. This enhances entertaining characteristics of the game.

When the displacement determining unit 130 determines success in striking, the display 40 displays a picture indicating the success (step S208). By way of example, an animation in which the sub-block is knocked away, or the image of characters meaning the success, is displayed on the display 40.

When the displacement determining unit 130 determines success in striking, the game-success determining unit 150 determines whether the game player has obtained a success in the game (step S209). When the knocked-away block is the final one stage, that is, all the sub-blocks have got knocked away, the game-success determining unit 150 determines that the game player has obtained a success in the game. When one or more sub-blocks remain, the game-success determining unit 150 determines that the game player should continuously play the game (step S209).

When the game-success determining unit 150 determines in step S209 that the game player has obtained a success in the game, a picture indicating the success is displayed on the display 40 (step S210), and the game is terminated (step S211). As the picture indicating the success, for example, an animation in which the game character raises the hands for expressing pleasure, or the image of characters "Perfect", is displayed.

When the displacement determining unit 130 has determined a failure in striking, the game-success determining unit 150 receives the determination result, and determines that the game player has lost the game (failure in the game) (step S212). In this case, a picture indicating the failure in the game is displayed on the display 40 (step S213). As the picture indicating the failure in the game, for example, an animation of falling main and sub-blocks, an animation of a rolling main-block, or the image of characters "Perfect", is displayed. After that, the game is terminated.

In the above-described game-executing method, only the case where the LV1 data are used as data for displaying the gauges 70X and 70Y has been described. However, by providing a process for selecting the game level before the initiation of the game, the game player is enabled to try to play the selected game, which has a higher degree of difficulty such as LV2 or LV3. In this case, by increasing the speed of changing the small areas 71 displayed by the gauges 70 to be greater than LV1, the degree of difficulty in playing the knock-away stacked-block game is increased. Such a change in the degree of the difficulty is effective in preventing the game player from getting tired of the game.

Another embodiment of the present invention is described below.

In the foregoing embodiment, the game-executing method using the portable game machine has been described. However, the game-executing method of the present invention may be practiced using multi-purpose computers such as personal computers, and domestic game machines. By way of example, by installing a program code recorded on a portable recording medium such as a CD-ROM or a digital versatile disk into a computer, or controlling the computer to perform direct reading from the recording medium and to execute the program code, functional sub-blocks similar to the operation-information decoding unit 110, the hammer determining unit 120, the displacement determining unit 130, the gauge control unit 140, the game-success determining unit 150, an image control unit 160, and an audio control unit 170, which are shown in FIG. 3, are generated in the computer, whereby a game having contents similar to those in the first embodiment can be executed. In this case, it is not always necessary to generate the functional sub-blocks from only the program code recorded on the recording medium. The functional sub-blocks may be generated such that the program code operates in association with an operating system for the computer or another application.

What is claimed is:

1. A method for executing a knock-away stacked-block game, said method provided for a game machine including an input means operated by a game player, a game-processing means for executing game processing based on an operation input from said input means, and a display for displaying the result of the processing executed by said game-processing means, said method comprising the steps of:
        displaying at least the image of a sub-block to be struck, among a plurality of stacked sub-blocks and a main-block provided thereon, on said display;
        using, among first strike data and second strike data sequentially input from said input means by a game player, the first strike data as information for determining a virtual displacement of a sub-block positioned at a predetermined stage among said plurality of sub-blocks, and the second strike data as a displacement of said sub-block within the virtual displacement, and determining the displacement of said sub-block based on the second strike in said game-processing means; and
        displaying, on said display, a resultant image corresponding to the state of each of the blocks which changes based on the determination result.

2. A method for executing a knock-away stacked-block game, according to claim 1, further comprising a step in which:
    when an accumulated value of displacements of said sub-block, caused by at least one strike, is greater than a predetermined first value corresponding to the width of each of said sub-blocks, or is within a predetermined second value corresponding to a range in which the sub-blocks and said main-block can balance on the second stage, said game-processing means determines that said at least one strike has been successful; and when the accumulated value is not greater than the first value and not less than the second value, said game-processing means determines that said at least one strike has failed, and displays a picture corresponding to the failure when said game-processing means has determined that said at least one strike has failed.

3. A method for executing a knock-away stacked-block game, according to claim 1, further comprising a step in which a plurality of gauges, composed of a plurality of small areas sequentially arranged in predetermined directions, are displayed on said display, and the gauges display timing information used as a guide for the game player to input the first strike data and the second strike data.

4. A method for executing a knock-away stacked-block game, according to claim 3, wherein the gauges use a move generated by sequentially displaying the small areas in the gauges, whereby the timing information is provided to the game player.

5. A method for executing a knock-away stacked-block game, according to claim 4, wherein the gauges consist of a gauge for inputting the first strike data and a gauge for inputting the second strike data.

6. A method for executing a knock-away stacked-block game, according to claim 5, wherein an indicator is displayed on a position in which said sub-block is struck and said indicator is changed in accordance with the display mode of the timing information.

7. A method for executing a knock-away stacked-block game, according to claim 6, wherein:
said gauge for inputting the first strike data and said gauge for inputting the second strike data use different display modes to display the timing information; and
said indicator is displayed so as to change depending on said different display modes.

8. A method for executing a knock-away stacked-block game, according to claim 7, wherein a change of said indicator in accordance with a move indicating the timing information, which corresponds to the input of the first strike data, is displayed as a change in the position of said indicator with respect to the position in which said sub-block is struck.

9. A method for executing a knock-away stacked-block game, according to claim 8, further comprising a step in which a plurality of choices on display-mode information for determining the move of the timing information are displayed for the game player, and the timing information is displayed by the gauges based on display-mode information selected with said input means by the game player before the game player inputs the first strike data.

10. A method for executing a knock-away stacked-block game, according to claim 9, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

11. A method for executing a knock-away stacked-block game, according to claim 8, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

12. A method for executing a knock-away stacked-block game, according to claim 7, further comprising a step in which a plurality of choices on display-mode information for determining the move of the timing information are displayed for the game player, and the timing information is displayed by the gauges based on display-mode information selected with said input means by the game player before the game player inputs the first strike data.

13. A method for executing a knock-away stacked-block game, according to claim 12, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

14. A method for executing a knock-away stacked-block game, according to claim 7, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

15. A method for executing a knock-away stacked-block game, according to claim 9, wherein a change of said indicator in accordance with a move indicating the timing information, which corresponds to the input of the first strike data, is displayed as a change in the position of said indicator with respect to the position in which said sub-block is struck.

16. A method for executing a knock-away stacked-block game, according to claim 15, further comprising a step in which a plurality of choices on display-mode information for determining the move of the timing information are displayed for the game player, and the timing information is displayed by the gauges based on display-mode information selected with said input means by the game player before the game player inputs the first strike data.

17. A method for executing a knock-away stacked-block game, according to claim 16, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

18. A method for executing a knock-away stacked-block game, according to claim 15, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

19. A method for executing a knock-away stacked-block game, according to claim 6, further comprising a step in which a plurality of choices on display-mode information for determining the move of the timing information are displayed for the game player, and the timing information is displayed by the gauges based on display-mode information selected with said input means by the game player before the game player inputs the first strike data.

20. A method for executing a knock-away stacked-block game, according to claim 19, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

21. A method for executing a knock-away stacked-block game, according to claim 6, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

22. A method for executing a knock-away stacked-block game, according to claim 6, further comprising a step in which a plurality of choices on display-mode information for determining the move of the timing information are displayed for the game player, and the timing information is displayed by the gauges based on display-mode information selected with said input means by the game player before the game player inputs the first strike data.

23. A method for executing a knock-away stacked-block game, according to claim 22, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

24. A method for executing a knock-away stacked-block game, according to claim 6, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

25. A method for executing a knock-away stacked-block game, according to claim 4, wherein an indicator is displayed on a position in which said sub-block is struck and said indicator is changed in accordance with the display mode of the timing information.

26. A method for executing a knock-away stacked-block game, according to claim 25, wherein:
said gauge for inputting the first strike data and said gauge for inputting the second strike data use different display modes to display the timing information; and
said indicator is displayed so as to change depending on said different display modes.

27. A method for executing a knock-away stacked-block game, according to claim 26, wherein a change of said indicator in accordance with a move indicating the timing information, which corresponds to the input of the first strike data, is displayed as a change in the position of said indicator with respect to the position in which said sub-block is struck.

28. A method for executing a knock-away stacked-block game, according to claim 27, further comprising a step in which a plurality of choices on display-mode information for determining the move of the timing information are displayed for the game player, and the timing information is displayed by the gauges based on display-mode information selected with said input means by the game player before the game player inputs the first strike data.

29. A method for executing a knock-away stacked-block game, according to claim 28, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

30. A method for executing a knock-away stacked-block game, according to claim 27, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

31. A method for executing a knock-away stacked-block game, according to claim 26, further comprising a step in which a plurality of choices on display-mode information for determining the move of the timing information are displayed for the game player, and the timing information is displayed by the gauges based on display-mode information selected with said input means by the game player before the game player inputs the first strike data.

32. A method for executing a knock-away stacked-block game, according to claim 31, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

33. A method for executing a knock-away stacked-block game, according to claim 26, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

34. A method for executing a knock-away stacked-block game, according to claim 25, wherein a change of said indicator in accordance with a move indicating the timing information, which corresponds to the input of the first strike data, is displayed as a change in the position of said indicator with respect to the position in which said sub-block is struck.

35. A method for executing a knock-away stacked-block game, according to claim 34, further comprising a step in which a plurality of choices on display-mode information for determining the move of the timing information are displayed for the game player, and the timing information is displayed by the gauges based on display-mode information selected with said input means by the game player before the game player inputs the first strike data.

36. A method for executing a knock-away stacked-block game, according to claim 35, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

37. A method for executing a knock-away stacked-block game, according to claim 34, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

38. A method for executing a knock-away stacked-block game, according to claim 25, further comprising a step in which a plurality of choices on display-mode information for determining the move of the timing information are displayed for the game player, and the timing information is displayed by the gauges based on display-mode information selected with said input means by the game player before the game player inputs the first strike data.

39. A method for executing a knock-away stacked-block game, according to claim 38, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

40. A method for executing a knock-away stacked-block game, according to claim 25, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

41. A method for executing a knock-away stacked-block game, according to claim 3, wherein the gauges consist of a gauge for inputting the first strike data and a gauge for inputting the second strike data.

42. A method for executing a knock-away stacked-block game, according to claim 41, wherein an indicator is displayed on a position in which said sub-block is struck and said indicator is changed in accordance with the display mode of the timing information.

43. A method for executing a knock-away stacked-block game, according to claim 42, wherein:
said gauge for inputting the first strike data and said gauge for inputting the second strike data use different display modes to display the timing information; and
said indicator is displayed so as to change depending on said different display modes.

44. A method for executing a knock-away stacked-block game, according to claim 43, wherein a change of said indicator in accordance with a move indicating the timing information, which corresponds to the input of the first strike data, is displayed as a change in the position of said indicator with respect to the position in which said sub-block is struck.

45. A method for executing a knock-away stacked-block game, according to claim 44, further comprising a step in which a plurality of choices on display-mode information for determining the move of the timing information are displayed for the game player, and the timing information is displayed by the gauges based on display-mode information selected with said input means by the game player before the game player inputs the first strike data.

46. A method for executing a knock-away stacked-block game, according to claim 45, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

47. A method for executing a knock-away stacked-block game, according to claim 44, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

48. A method for executing a knock-away stacked-block game, according to claim 43, further comprising a step in which a plurality of choices on display-mode information for determining the move of the timing information are displayed for the game player, and the timing information is displayed by the gauges based on display-mode information selected with said input means by the game player before the game player inputs the first strike data.

49. A method for executing a knock-away stacked-block game, according to claim 48, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

50. A method for executing a knock-away stacked-block game, according to claim 43, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

51. A method for executing a knock-away stacked-block game, according to claim 42, wherein a change of said indicator in accordance with a move indicating the timing information, which corresponds to the input of the first strike data, is displayed as a change in the position of said indicator with respect to the position in which said sub-block is struck.

52. A method for executing a knock-away stacked-block game, according to claim 51, further comprising a step in which a plurality of choices on display-mode information for determining the move of the timing information are displayed for the game player, and the timing information is displayed by the gauges based on display-mode information selected with said input means by the game player before the game player inputs the first strike data.

53. A method for executing a knock-away stacked-block game, according to claim 52, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

54. A method for executing a knock-away stacked-block game, according to claim 51, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

55. A method for executing a knock-away stacked-block game, according to claim 42, further comprising a step in which a plurality of choices on display-mode information for determining the move of the timing information are displayed for the game player, and the timing information is displayed by the gauges based on display-mode information selected with said input means by the game player before the game player inputs the first strike data.

56. A method for executing a knock-away stacked-block game, according to claim 55, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

57. A method for executing a knock-away stacked-block game, according to claim 42, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

58. A method for executing a knock-away stacked-block game, according to claim 41, further comprising a step in which a plurality of choices on display-mode information for determining the move of the timing information are displayed for the game player, and the timing information is displayed by the gauges based on display-mode information selected with said input means by the game player before the game player inputs the first strike data.

59. A method for executing a knock-away stacked-block game, according to claim 58, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

60. A method for executing a knock-away stacked-block game, according to claim 41, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

61. A method for executing a knock-away stacked-block game, according to claim 4, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

62. A method for executing a knock-away stacked-block game, according to claim 4, further comprising a step in which a plurality of choices on display-mode information for determining the move of the timing information are displayed for the game player, and the timing information is displayed by the gauges based on display-mode information selected with said input means by the game player before the game player inputs the first strike data.

63. A method for executing a knock-away stacked-block game, according to claim 62, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

64. A method for executing a knock-away stacked-block game, according to one of claim 1, further comprising a step in which a plurality of choices on display-mode information for determining the move of the timing information are displayed for the game player, and the timing information is displayed by the gauges based on display-mode information selected with said input means by the game player before the game player inputs the first strike data.

65. A method for executing a knock-away stacked-block game, according to claim 64, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

66. A method for executing a knock-away stacked-block game, according to claim 1, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

67. A method for executing a knock-away stacked-block game, according to claim 3, further comprising a step in which a plurality of choices on display-mode information for determining the move of the timing information are displayed for the game player, and the timing information is displayed by the gauges based on display-mode information selected with said input means by the game player before the game player inputs the first strike data.

68. A method for excuting a knock-way stacked-back game, according to claim 67, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

69. A method for executing a knock-away stacked-block game, according to claim 3, further comprising a step in which, when all the sub-blocks have got knocked away, said game-processing means determines that the game player obtains a success in the game, and when said game-processing means has determined that the game player has obtained a success in the game, a picture corresponding to the success is displayed on said display.

70. A game machine, comprising:
input means operated by a game player;
game-processing means for executing game processing based on an operation input from said input means; and
a display for displaying the result of the processing executed by said game-processing means; wherein:
said game-processing means displays at least the image of a sub-block to be struck on said display among a plurality of stacked sub-blocks and a main-block provided thereon;
said game-processing means uses, among first strike data and second strike data sequentially input from said input means by a game player, the first strike data as information for determining a virtual displacement of a sub-block positioned at a predetermined stage among said plurality of sub-blocks, and the second strike data as a displacement of said sub-block within the virtual displacement, and determines the displacement of said sub-block based on the second strike in said game-processing means; and
said game-processing means displays, on said display, a resultant image corresponding to the state of each of the blocks which changes based on the determination result.

71. A game machine according to claim 70, wherein said input means, said game-processing means, and said display are accommodated in a housing which is small enough to be carried.

72. A recording medium containing a program code for controlling a computer to operate as a game machine, said computer including a predetermined display and an input means operated by a game player, wherein said program code controls said computer to execute the steps of:

displaying at least the image of a sub-block to be struck, among a plurality of stacked sub-blocks and a main-block provided thereon, on said display;

using, among first strike data and second strike data sequentially input from said input means by a game player, the first strike data as information for determining a virtual displacement of a sub-block positioned at a predetermined stage among said plurality of sub-blocks, and the second strike data as a displacement of said sub-block within the virtual displacement, and determining the displacement of said sub-block based on the second strike in said game-processing means; and displaying, on said display, a resultant image corresponding to the state of each of the blocks which changes based on the determination result.

* * * * *